United States Patent Office 3,251,867
Patented May 17, 1966

3,251,867
11α-HYDROXYLATION OF FUNTUMINE AND DERIVATIVES THEREOF
George Greenspan, Narberth, Richard Rees, Newtown Square, and Leland L. Smith, Malvern, Pa., assignors to American Home Products Corporation, New York, N.Y., a corporation of Delaware
No Drawing. Filed June 11, 1964, Ser. No. 374,291
7 Claims. (Cl. 260—397.45)

This application is a continuation-in-part of copending application, Serial No. 333,209, filed December 24, 1963, and now abandoned.

This invention is directed to novel steroid compounds and to new compounds derivable therefrom. More particularly, this invention relates to derivatives of funtumine and funtumidine and to the methods by which such derivatives are prepared.

The new steroids of the present invention considered in their broadest aspect include those encompassed within Formulae Ia and Ib below:

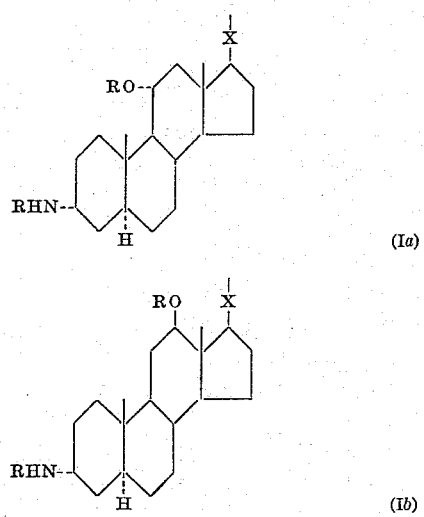

wherein R is selected from the group consisting of hydrogen and lower acyl; X is selected from the group consisting of

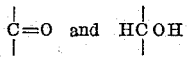

together with the therapeutically acceptable acid salts of these compounds. It is preferred that the lower acyl substituent identified be limited to lower alkanoyl having 5 carbon atoms or less. Additionally with respect to Formulae Ia and Ib, it is to be understood that the substituents shown at the 3α and the 11α or 12β positions, identified by R, may be similar or dissimilar in a particular species of the new compounds.

It has been found according to the present invention that the new compounds thereof, encompassed within Formulae Ia and Ib above, can be quite unexpectedly obtained by the activity of a microorganism or funtumine or funtumidine. The microbiological fermentation of these materials results in the production of 11α- and 12β-hydroxy products. The microorganism effective in accomplishing this result is *Aspergillus ochraceus*.

Below there is set forth a reaction sequence which is representative of the method of the present invention. Though the reaction utilizes a single starting material and shows but a single species (there being two products), it is to be understood that these are representative of the other starting compounds which can be used and of the various products that can be obtained.

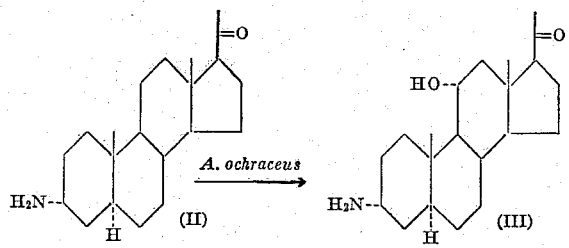

In the foregoing reaction sequence, the starting material identified by Formula II, namely funtumine, which may also be identified as 3α-amino-5α-pregnan-20-one, may be prepared according to the method described in Compt. rend. Acad. Sci. 240, 3076, 1958. In carrying out the microbiological reaction, funtumine is subjected to the fermentative action of the selected microbiological organism *Aspergillus ochraceus*. It has been found that *Aspergillus ochraceus*, NRRL 405, is uniquely effective for this purpose. When the product desired is to include the hydroxyl at 20-, funtumidine is used as a starting material. Preparation of the latter is also described in the reference cited. The other compounds encompassed within those defined by Formulae Ia and Ib above and encompassed within the scope of the present invention are preparable by further reacting the 11α- or 12β-hydroxy products with suitable acylating agents, such as for example acetic anhydride, according to the method described in the specific examples which follow.

The 11α- and 12β-hydroxy products of this invention have valuable antibacterial properties and are therefore useful as bactericides. In addition they possess antilipemic activity without at the same time having estrogenic or feminizing properties. Further, the 11α-hydroxyfuntumine (III) is particularly useful in the preparation of known steroids, such as for example the known and useful steroid intermediate, 11α-hydroxy-5α-pregnane-3,20-dione. The latter is in turn readily converted into the known and useful 11α-hydroxyprogesterone.

When the new steroids of the present invention are utilized for the purposes indicated, it may be convenient to use them alone or in combination with a pharmaceutically acceptable, organic or inorganic, solid or liquid carrier suitable for enteral or parenteral administration. For making up the preparation, there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or other known carriers for medicaments. The pharmaceutical preparations may be in the solid form, for example as capsules, tablets, dragees and the like, or in liquid form, for example, as solutions, suspensions, emulsions and the like. They may also contain auxiliary substances, such as preserving, stabilizing, wetting, emulsifying agents and the like, salts for varying the osmotic pressure, buffers, etc.

As described above, the new compounds of the present invention may be used in the form of their pharmaceutically acceptable acid addition salts. Such salts are obtained by conventional practice by treating the free base form of the compounds described with an acceptable organic or inorganic acid. Suitable acids for this purpose include hydrobromic, sulfuric, phosphoric, nitric, naphthalene sulfonic, salicyclic, glycolic, acetic, maleic, succinic, tartaric, stearic, palmitic, citric, glutaric, lactic and the like.

As has been suggested, the hydroxylation of funtumine or funtumidine utilizes the *Aspergillus ochraceus* microorganism. A preferred strain of the latter is *Aspergillus ochraceus* NRRL 405, which is obtainable from the Northern Regional Research Laboratories, Peoria, Illinois.

*Aspergillus ochraceus* NRRL 405 can be grown on a dextrose, peptone, corn steep liquor, salts medium at a temperature of about 28° C. for a period of about 64 hours. Suitable nutrient media which may also be used include a yeast extract-dextrose medium or a malt extract-yeast extract-dextrose medium. Other suitable media which contain the necessary carbon, nitrogen and mineral elements, in the form of carbon include sugars such as glucose, sucrose, maltose, xylose, galactose and so forth; alcohols such as glycerol or mannitol; organic acids such as citric acid, maleic acid, acetic acid and various other natural products containing carbohydrates such as corn starch, corn steep liquor, soya bean meal, cotton seed meal and many available materials which have been described heretofore as a source of carbon in steroid fermentation processes. Usually a variety of a carbon sources can be employed in the medium with good results. Suitable sources of nitrogen include a number of the above named materials such as corn steep liquor, soya bean meal, cotton seed meal and various other substances such as beef extract, casein, yeast, enzymatically digested proteins, degradation products including peptones, amino acids and many other available proteinaceous materials which have been found to be suitable in supporting the growth of fungi. Inorganic sources of nitrogen include ammonium salts and nitrates which may also be used in the medium as a source of nitrogen to provide a favorable growth medium for the organism.

The mineral requirements of fermentation are usually supplied in the crude materials which are often used as sources of carbon and nitrogen or water that is used in the process. However, it may be advisable to supplement the minerals normally present with added amounts to obtain maximum growth. Cations and anions which may be desirable in added amounts include sodium, potassium, calcium, magnesium, phosphate, sulfate, chloride, cobalt, manganese and various others. The use of elements such as boron, copper, cobalt, molybdenum and chromium is often desirable.

The growth of the organism takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ½ to 2 volumes of air per volume of medium per minute. Agitation in the bottles or fermentor tanks is provided by mechanical impeller. It is a preferable to carry out the process of the present invention at a temperature within the range of about 15° C. to about 37° C.

To obtain large working quantities of the culture *Aspergillus ochraceus* NRRL 405, the following method may be used. Erlenmeyer flasks with a corn steep liquor-peptone-dextrose-salts medium, 100 ml. in 500 ml. flasks, are inoculated with a spore suspension prepared from agar slant growth of *Aspergillus ochraceus* NRRL 405. The flasks are incubated at 28° C. on a rotary shaker, 250 r.p.m., 2" diameter of rotation, for 64 hours. Ten percent transfers are then made to 2-liter flasks, each with 400 ml. of the same medium.

After the growth of the microorganism has taken place for 24 hours, the steroid is added to the fermentation in solution or finely divided form. One of the preferred methods is to dissolve the steroid in methanol or other water-miscible solvents and add it to the fermentation medium at the desired stage in the process. Although the steroid may precipitate from solution when so added, it is dispersed through the medium as a fine suspension and becomes readily available to the organism for oxidation. The amount of steroid added to the fermentation medium may vary considerably but is generally about $\frac{1}{10}$ to 1 gram per liter of medium.

During the fermentation process, it may be desirable to add anti-foaming agents such as silicones or glyceride oils. These compounds are added from time to time as needed. The fermentation is allowed to proceed for a period of time long enough to achieve maximum conversion of the steroid to the 11α-hydroxy product.

The method of the present invention and the products obtainable thereby will be more clearly understood by reference to the specific examples which follow:

*Example I*

A water suspension of spores of *Aspergillus ochraceus* NRRL 405, prepared from agar slant growth, is used to inoculate a 250 ml. flask with 50 ml. of medium of the following composition constituted on a g./l. basis: yeast extract 10 g. dextrose 10 g. distilled $H_2O$ 1,000 ml. The flasks are incubated on a rotary shaker 250 r.p.m. 2" diameter of rotation, at 28° C. After 64 hours of growth, a 7% mycelial transfer is made to a flask of the same medium which is shaken for 24 hours. Funtumine hydrochloride, 12.5 mg. dissolved in 0.5 ml. ethanol, is added to the flask which is further incubated for an additional 22 hours.

A 5 ml. sample is taken from the fermentation flask, the pH adjusted to 12.0 with 2.5 N NaOH and then extracted with 1 ml. of methyl isobutylketone. The solvent extract is spotted on No. 4 Whatman paper and the paper-gram run in a solvent system composed of butyl acetate, n-butanol, acetic acid and water (8:1:1:3). The dried paper-gram, when sprayed with the Dragendorff reagent, discloses a single polar zone shown by thin layer chromatography to contain two products, 11α-hydroxyfuntumine and 12β-hydroxyfuntumine, with no substrate remaining.

*Example II*

Spore suspensions prepared from surface growth on agar slants of *Aspergillus ochraceus* NRRL 405 are employed to inoculate one and two liter flasks of yeast extract-dextrose medium (Example I) with 200 and 400 ml. respectively. The flasks are incubated on a rotary shaker for 49 hours, after which 5% mycelial transfers are made to 44 2 liter flasks, each with 404 ml. of a medium constituted on a g./l. basis as follows: corn steep liquor 5 g., dextrose 50 g., peptone 20 g. and distilled $H_2O$ 1,000 ml. Following 24 hours of shaking on rotary or reciprocating shakers, 28 or 26° C., funtumine base, 160 mg. in 3.2 ml. of ethanol, is added to each flask. The flasks, containing 6.94 of fermented steroid, are harvested over a twenty hour period, from 117 to 137 hours. The broth is adjusted to pH 8–9 with 0.5 N sodium hydroxide solution and extracted with ethyl acetate. The combined extracts are concentrated under vacuum to furnish 20 g. of a dark colored oil. After raising the pH to 10–11, further ethyl acetate extractions are conducted. The materials from the extractions are dissolved in 300 ml. of ether and refrigerated at −10° C. for several days after which time 800 mg. of solids were removed by filtration. These solids contain no nitrogenous steroids and are discarded.

The remaining ether filtrate is extracted with three 60 ml. portions of 3.5% hydrochloric acid. The aqueous acidic extracts are made basic (to pH 11) with 1 N potassium hydroxide solution, and the oily material which is precipitated is re-extracted into ether. This final ether extract contains most of the Dragendorff-positive materials, and the oil (2.0 g.) obtained from the ether extract is crystallized from ethyl acetate, yielding 900 mg. of the sought transformation products of funtumine. After extensive column chromatography on silica gel, there was separated two monohydroxy derivatives of funtumine. Product A, identified as 11α-hydroxy funtumine, M.P. 150–154° C., and Product B, identified as 12β-hydroxy funtumine, M.P. 204–207° C., $[\alpha]_D$ +7.9°.

*Analysis.*—Calcd. for $C_{21}H_{35}O_2N$: C, 75.63; H, 10.58; N, 4.20. Found: Product A, C, 76.0; H, 10.4; N, 4.0. Product B, C, 75.38; H, 10.30; N, 4.06.

Example III

A solution of 400 mg. of 11α-hydroxyfuntumine in 5 ml. of pyridine and 4.5 ml. of acetic anhydride is maintained at room temperature for 16 hours. After removal of the solvents under vacuum, a yellow oil is obtained which is chromatographed over silica gel. The desired product is eluted and the eluates concentrated in vacuum, yielding 40 mg. of pure 3α-acetylamino-11α-acetoxy-5α-pregnane-20-one. The diacetate is characterized by infrared spectra: bands at 2.90μ (—NH), 5.80μ (20-one), 6.00μ (amide), and by nuclear magnetic resonance spectra: bands at 0.68 p.p.m. ($C_{18}$-methyl group), 0.92 p.p.m. ($C_{19}$-methyl group), 2.02 p.p.m. (amide acetyl methyl group, —NHCOCH$_3$), 2.09 p.p.m. (ester acetyl methyl group, —OCOCH$_3$), 2.12 p.p.m. $C_{21}$-methyl group), 4.17 p.p.m. (multiplet) (3β-proton), 5.17 p.p.m. (multiplet) (11β-proton), 5.88 p.p.m. (multiplet) (amide NH).

If one utilizes 12β-hydroxyfuntumine in the foregoing reaction, there is obtained 3α-acetylamino-12β-acetoxy-5α-pregnane-20-one.

Example IV

Treating 11α hydroxyfuntumine with propionyl chloride in a manner similar to that described in Example III above results in 3α-propionylamino-11α-propionyloxy-5α-pregnane-20-one.

As has been suggested, the product of the microbiological transformation of funtumine, namely the 11α-hydroxyfuntumine, is useful in the preparation of other valuable steroid products. The manner in which this compound is used will be more clearly understood by reference to Example V which follows.

Example V

A solution of 200 mg. of 11α-hydroxyfuntumine in 6 ml. of benzene is stirred with 250 mg. of osmium tetroxide for 10 hours. After solvent removal, the dark needles are dissolved in 6 ml. of methanol and 800 mg. of sodium sulfite in 5 ml. of water is added, and stirring continued for 8 hours. The mixture is diluted with ether, filtered, and washed with 2 N sulfuric acid, 2 N sodium carbonate solution, and finally with water. The dark product thus obtained is chromatographed on neutral alumina using benzene as eluting solvent. The eluted product is crystallized from acetone-ether, yielding 11α-hydroxy-5α-pregnan-3,20-dione, M.P. 185–195° C. Infrared spectra, mixture melting points, and thin-layer chromatography established the identity of the product by comparison with a known, standard 11α-hydroxy-5α-pregnan-3,20-dione.

The product of the foregoing example, namely 11α-hydroxy-5α-pregnan-3,20-dione serves as a proof of structure of compound III and is also of value since it may be conveniently converted to 11α-hydroxyprogesterone according to the method described in O. Mancera et al., J. Org. Chem. 17, 1066 (1952).

Example VI

Harvested broth from a fermentation of 7.0 g. of funtumidine is filtered, and the mycelial solids are washed with ethyl acetate. The aqueous filtrate is adjusted to pH 9–10 with 400–500 ml. of concentrated ammonium hydroxide and extracted four times with 10 l. of ethyl acetate. In between extractions, the pH is readjusted to pH 9–10 if necessary. The combined ethyl acetate washes and extracts are concentrated at 34–45° C. under vacuum to about 50 ml. volume, from which crude products are obtained. Two such fermentation products are combined at this stage (about 7.0 g. of product which analyzes as a two component mixture by thin-layer chromatography) and chromatographed on 300 g. of silica gel. Elution of the column with chloroform (all solvents are shaken with concentrated ammonium hydroxide prior to use) gives 920 mg. of 12β-hydroxy funtumidine (product B). Continued elution with chloroform-methanol (95:5) afforded 1.46 g. of mixed fractions of Products A (11α-hydroxyfuntumidine) and B, and finally 1.2 g. of crystalline Product A, M.P. 146–155° C.

Product B (12β-hydroxyfuntumidine) remains an amorphous solid even after sublimation. Product A is recrystallized from ethyl acetate, giving material of M.P. 163–164° C., and finally sublimes under vacuum and recrystallized from ethyl acetate, giving the pure sample, M.P. 158–160° C., $[\alpha]_D$ —7.5° (2% methanol in chloroform).

*Analysis.*—Calcd. for $C_{21}H_{37}O_2N$: C, 75.17; H, 11.12; N, 4.18. Found: C, 75.10; H, 10.91; N, 4.01.

Reacting Product A or B above with acetic anhydride according to the method of Example III results in the production of 3α-acetylamino-11α,20α-diacetoxy-5α-pregnane and 3α-acetylamino-12β,20α-diacetoxy-5α-pregnane respectively.

Example VII

Two hundred milligrams of Product B from Example II is dissolved in 50 ml. of absolute ethanol and refluxed with stirring under nitrogen. Five grams of sodium metal is added in small pieces over a period of one hour. The mixture is then poured onto ice and extracted four times with ethyl acetate, and the ethyl acetate extracts are washed with water and then evaporated under vacuum. A yellow foam, 190 mg., results, which is dissolved in ethyl acetate. Crystalline material, 35 mg., M.P. 194–204° C., separates, which is filtered and recrystallized from ethyl acetate to give 12 mg. of 12β-hydroxyfuntumidine, M.P. 203–209° C.

*Analysis.*—Calcd. for $C_{21}H_{37}O_2N$: C, 75.17; H, 11.12; N, 4.18. Found: C, 74.8; H, 11.0; N, 4.0.

Example VIII

A solution of 75 mg. of 11α-hydrofuntumidine in 0.7 ml. of pyridine and 0.6 ml. of acetic anhydride is maintained at room temperature for 18 hours, at which time the solvents are removed under vacuum. The residue of 61 mg., M.P. 152–156° C., is recrystallized from ether-hexane, giving the analytical sample of 3α-acetylamino-11α,20α-diacetoxy-5α-pregnane, M.P. 160–161° C.; $[\alpha]_D$ +7.9°.

*Analysis.*—Calcd. for $C_{27}H_{43}O_5N$: C, 70.25; H, 9.30; N, 3.03. Found: C, 70.19; H, 9.26; N, 3.65.

In a similar manner to the method of Example VIII, starting with 12β-hydroxyfuntumidine, one obtains 3α-acetylamino-12β,20α-diacetoxy-5α-pregnane.

While the foregoing invention has been described with some degree of particularity in the specific examples above, it is to be understood that this invention is not to be limited thereby but is to be limited only by the claims appended hereto.

The invention claimed is:

1. A compound selected from the group consisting of (1) a compound having the formula:

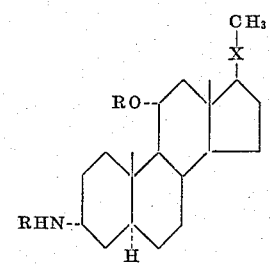

wherein R in both the 3- and the 11-positions are similar and are selected from the group consisting of H and lower alkanoyl having not more than 5 carbon atoms, X is selected from the group consisting of

and

(2) a compound having the formula:

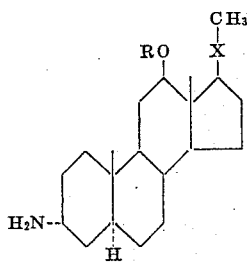

wherein R is selected from the group consisting of H and lower alkanoyl having not more than 5 carbon atoms, X is selected from the group consisting of

and

and (3) the therapeutically acceptable acid salts of (1) and (2).

2. 11α-hydroxyfuntumine.
3. 3α-acetylamino-11α-acetoxy-5α-pregnane-20-one.
4. 11α-hydroxyfuntumidine.
5. 12β-hydroxyfuntumine.
6. 12β-hydroxyfuntumidine.
7. 3α-acetylamino-11α,20α-diacetoxy-5α-pregnane.

References Cited by the Examiner
UNITED STATES PATENTS 2,844,513  7/1958  Wettstein et al. _____ 195—3
2,914,543  11/1959  Fried et al. _____ 260—397.3

LEWIS GOTTS, *Primary Examiner.*